(12) United States Patent
Fredlund

(10) Patent No.: US 7,327,890 B2
(45) Date of Patent: Feb. 5, 2008

(54) IMAGING METHOD AND SYSTEM FOR DETERMINING AN AREA OF IMPORTANCE IN AN ARCHIVAL IMAGE

(75) Inventor: John R. Fredlund, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 759 days.

(21) Appl. No.: 10/324,489

(22) Filed: Dec. 20, 2002

(65) Prior Publication Data

US 2004/0120606 A1 Jun. 24, 2004

(51) Int. Cl.
*G06K 9/68* (2006.01)

(52) U.S. Cl. .................................... 382/218
(58) Field of Classification Search ............... 382/305, 382/218
See application file for complete search history.

(56) References Cited

U.S. PATENT DOCUMENTS

| | | |
|---|---|---|
| 3,971,065 A | 7/1976 | Bayer |
| 4,642,678 A | 2/1987 | Cok |
| 4,685,143 A | 8/1987 | Choate |
| 4,955,064 A | 9/1990 | Shirasaka et al. |
| 4,969,202 A | 11/1990 | Groezinger |
| 5,001,507 A | 3/1991 | Iida et al. |
| 5,016,107 A | 5/1991 | Sasson et al. |
| 5,081,689 A | 1/1992 | Meyer et al. |
| 5,103,254 A | 4/1992 | Bell et al. |
| 5,142,380 A | 8/1992 | Sakagami et al. |
| 5,164,831 A | 11/1992 | Kuchta et al. |
| 5,227,824 A | 7/1993 | Yoshida et al. |
| 5,361,119 A | 11/1994 | Shida et al. |
| 5,373,322 A | 12/1994 | LaRoche et al. |
| 5,440,369 A | 8/1995 | Tabata et al. |
| 5,444,798 A | 8/1995 | Enomoto et al. |
| 5,446,804 A | 8/1995 | Allebach et al. |
| 5,455,654 A | 10/1995 | Suzuki |
| 5,477,264 A | 12/1995 | Sarbadhikari et al. |
| 5,496,106 A | 3/1996 | Anderson |
| 5,557,328 A | 9/1996 | Ishihama et al. |
| 5,557,358 A | 9/1996 | Mukai et al. |
| 5,563,718 A | 10/1996 | Wober et al. |

(Continued)

FOREIGN PATENT DOCUMENTS

EP WO 01/26021 4/2001

(Continued)

OTHER PUBLICATIONS

"Looking at Pictures:Affective facial, visceral, and behavioral reactions", by Peter J. Lang et al., Psychophysiology, 30 (1993) 261-273.

(Continued)

*Primary Examiner*—Bhavesh M Mehta
*Assistant Examiner*—Jonathan Schaffer

(57) ABSTRACT

A method is provided for determining an area of importance in an archival image. In accordance with the method, an evaluation images is obtained during composition of an archival image and the archival image is obtained. The evaluation image is compared to the archival image to determine common image elements and area of importance data is determined that identifies the common image elements. The area of importance data is associated with the archival image.

42 Claims, 9 Drawing Sheets

U.S. PATENT DOCUMENTS

| | | | |
|---|---|---|---|
| 5,634,040 A | 5/1997 | Her et al. | |
| 5,666,215 A | 9/1997 | Fredlund et al. | |
| 5,666,566 A | 9/1997 | Gu et al. | |
| 5,668,597 A | 9/1997 | Parulski et al. | |
| 5,697,001 A | 12/1997 | Ring et al. | |
| 5,710,954 A | 1/1998 | Inoue | |
| 5,715,483 A | 2/1998 | Omata et al. | |
| 5,734,425 A | 3/1998 | Takizawa et al. | |
| 5,742,233 A | 4/1998 | Hoffman et al. | |
| 5,760,917 A | 6/1998 | Sheridan | |
| 5,765,045 A | 6/1998 | Takagi et al. | |
| 5,822,542 A * | 10/1998 | Smith et al. | 709/247 |
| 5,874,994 A | 2/1999 | Xie et al. | |
| 5,877,809 A | 3/1999 | Omata et al. | |
| 5,892,991 A | 4/1999 | Hamada et al. | |
| 5,909,598 A | 6/1999 | Kadohara | |
| 6,004,061 A | 12/1999 | Manico et al. | |
| 6,067,114 A | 5/2000 | Omata et al. | |
| 6,172,706 B1 | 1/2001 | Tatsumi | |
| 6,252,989 B1 | 6/2001 | Geisler et al. | |
| 6,282,231 B1 | 8/2001 | Norman et al. | |
| 6,282,317 B1 | 8/2001 | Luo et al. | |
| 6,287,252 B1 | 9/2001 | Lugo | |
| 6,294,993 B1 | 9/2001 | Calaman | |
| 6,345,274 B1 | 2/2002 | Zhu et al. | |
| 6,438,323 B1 | 8/2002 | DeCecca et al. | |
| 6,522,354 B1 | 2/2003 | Kawamura et al. | |
| 2001/0003182 A1 | 6/2001 | Labelle | |
| 2001/0012072 A1 | 8/2001 | Ueno | |
| 2002/0019584 A1 | 2/2002 | Schulze et al. | |
| 2002/0076100 A1 | 6/2002 | Luo | |
| 2002/0109779 A1 | 8/2002 | Kuroiwa | |
| 2002/0191860 A1 | 12/2002 | Cheatle | |
| 2002/0191861 A1 | 12/2002 | Cheatle | |
| 2003/0025812 A1 | 2/2003 | Slatter | |
| 2003/0076429 A1 | 4/2003 | Karasaki et al. | |
| 2003/0080974 A1 | 5/2003 | Grosvenor et al. | |
| 2003/0117511 A1 | 6/2003 | Belz et al. | |
| 2003/0146997 A1 | 8/2003 | Fredlund et al. | |
| 2004/0085470 A1 | 5/2004 | Miyashita | |
| 2004/0246360 A1 | 12/2004 | Stavely et al. | |

FOREIGN PATENT DOCUMENTS

| | | | |
|---|---|---|---|
| EP | WO 01/71636 | | 9/2001 |
| EP | WO 02/27640 | | 4/2002 |
| EP | 1 431 912 A | | 6/2004 |
| JP | 11-196301 | | 7/1999 |
| JP | 2001 116985 | | 10/1999 |

OTHER PUBLICATIONS

"FotoFile: A Consumer Multimedia Organization and Retrieval System", by Allan Kuchinsky et al.

"Facial ExpressionRecognition using a Dynamic Model and Motion Energy", by Irfan Essa et al. MIT Media Laboratory Perceptual Computing Section Technical Report No. 307, pp. 1-8.

Digital Still Camera Image File Format Standard, Version 2.1, Jul. 1998, Japan Electronic Industry Development Association.

"Behind Blue Eyes" by Claire Tristram, Technology Review, May 2001.

CompactFlash Specification Revision 1.4, CompactFlash Association, Jul. 1999.

U.S. Appl. No. 09/549,356, entitled "Customizing A Digital Camera" by Prabu et al., filed Apr. 14, 2000.

* cited by examiner

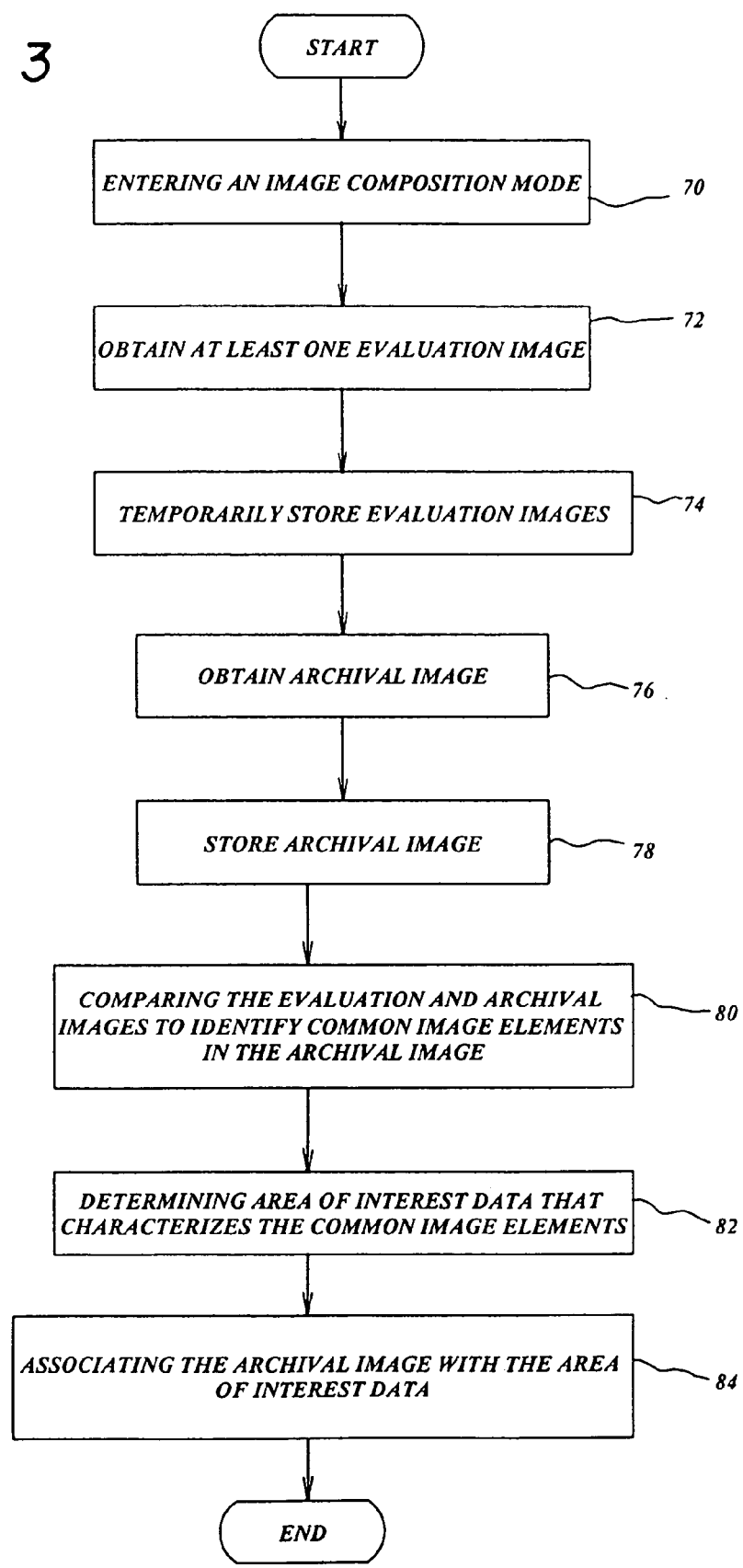

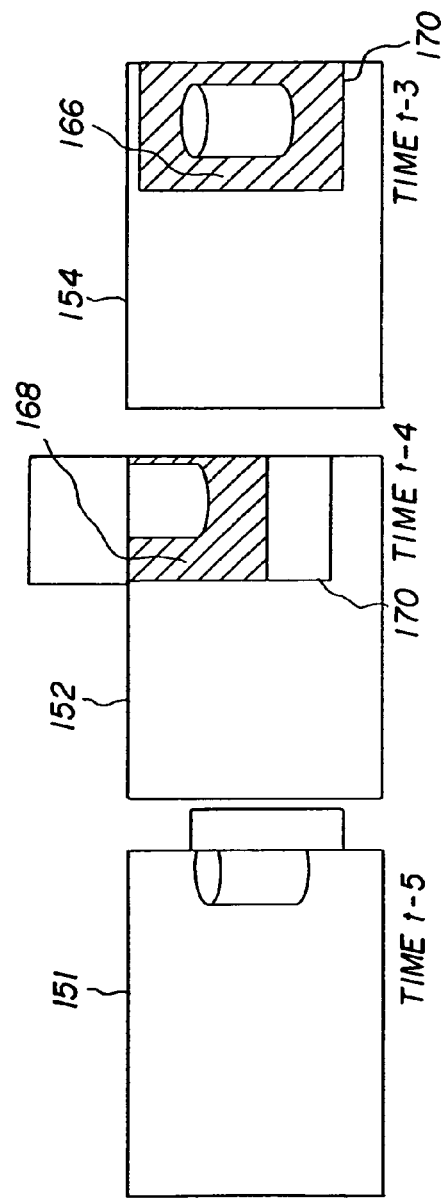

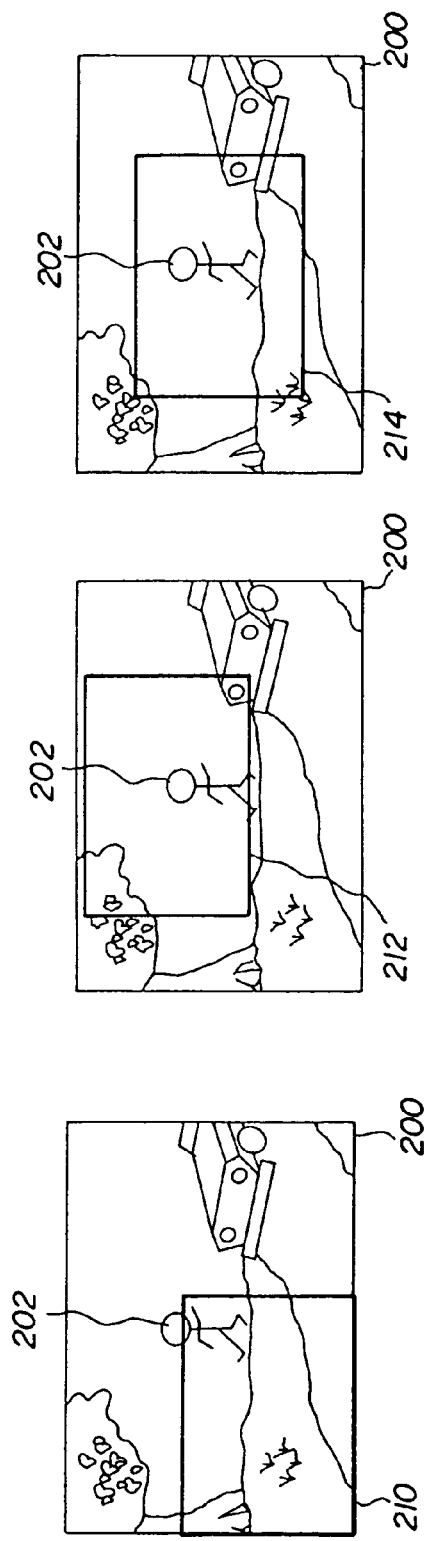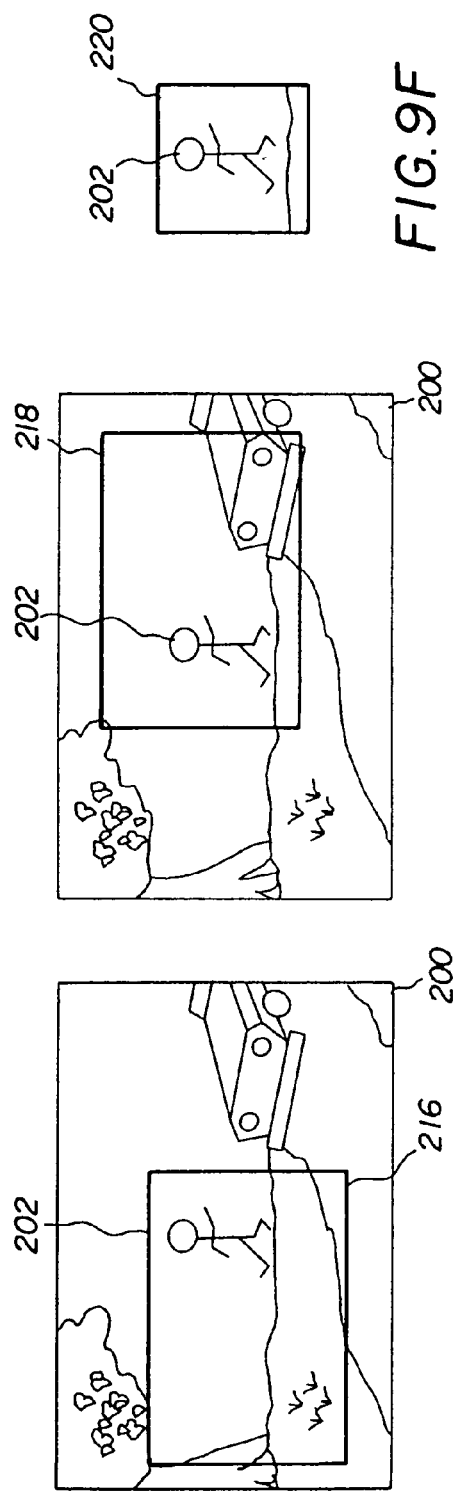

IMAGING METHOD AND SYSTEM FOR DETERMINING AN AREA OF IMPORTANCE IN AN ARCHIVAL IMAGE

FIELD OF THE INVENTION

The present invention relates to imaging methods and systems that determine an area of importance in an archival image.

BACKGROUND OF THE INVENTION

Digital images are becoming an increasingly popular form of infoimaging. One reason for this popularity is the ease with which users can manipulate, edit, alter and enhance such digital images. For example, users often use manual digital imaging and editing tools, such as the crop and zoom tools provided in the Kodak Picture CD software sold by Eastman Kodak Company, Rochester, N.Y., U.S.A., to improve the appearance of digital images. These image editing tools allow a user to limit the image content of an image to emphasize important elements in the image. Other image editing tools can also be usefully applied to portions of images that a user considers to be important. However, manual editing tools require that the user manually designate areas of importance in each image that is to be edited. Many users find this process time consuming and, accordingly, only select images are edited in this manner.

Automatic and semi-automatic image processing and editing algorithms are known. These can be applied to enhance the appearance of a digital image while requiring little user input. These automatic and semi-automatic image processing algorithms analyze the content of an image and apply various assumptions about what the user would likely find to be important elements of an image. For example, large oval shaped objects having color that approximates known flesh tones can be assumed to be important to the user. The degree of presumed importance can be increased where, for example, the large oval face shaped objects are positioned near the center of an image. See for example, commonly assigned U.S. Pat. No. 6,282,317, entitled "Method For Automatic Determination of Main Subjects in Photographic Images" filed by Luo et al. on Dec. 31, 1998. Other algorithms use frequency analysis of the digital data that forms digital images to identify elements of an image that are considered to be of greater importance. Such algorithms make assumptions about what is important in an image based upon analysis of the visual elements of the captured image. See for example commonly assigned U.S. patent application Ser. No. 09/176,805 entitled "Determining Portions of a Digital Image Which are In Focus" filed by Erkkilea et al. on Oct. 22, 1998.

Knowledge of what is important in an image can be useful for other purposes. For example, when searching for images, a user manually sorts through images or manually inputs text based descriptions of images to enable an image search. What is preferred of course, is for the user to submit an exemplar image from which similar images can be identified. See for example commonly assigned U.S. Pat. No. 6,345,274, entitled "Method and Computer Program Product for Subjective Image Content Similarity-based Retrieval" filed by Zhu et al. on Jun. 29, 1998. The '274 patent describes image processing algorithms that allow images to be searched by identifying images that are like the exemplar. However, photographs typically contain many objects, shapes, textures, colors, and other visual elements that may or may not be important in the search for similar images. Therefore, algorithms that search for images based upon an exemplar, are also required to make assumptions about which elements of the image are important in order to reduce the possibility that images will be identified by the algorithms as being similar to the exemplar based upon the presence of visual elements that are not important to the searcher.

The effectiveness of such image enhancement, searching, and other image using algorithms can be enhanced where there is a positive indication as to what portions of an image contain the most important image elements. Therefore there is a need for an automatic way to determine what visual elements in an image are of greater importance.

One way to obtain an indication of what is important in an image is to obtain the indication at the time the image is captured. A variety of cameras are known which attempt to discern which areas of an image of a scene are of interest to a user of the camera. For example, U.S. Pat. No. 5,765,045, entitled "Camera Capable of Detecting Eye-Gaze" filed on Jun. 7, 1995, by Takagi et al. and Japanese Publication, No. JP 2001 116985, entitled "Camera With Subject Recognizing Function and Subject Recognizing Method" filed by Mitsuru on Oct. 12, 1999, discusses the use of the eye gaze monitoring devices in the viewfinders of the cameras described therein. The cameras described in these publications are automatic focus cameras that utilize multi-spot range finding techniques that divide a photographic scene into a plurality of spots or regions and determine a distance from the camera to each spot. The output of the eye gaze monitoring devices described therein is used to help the camera determine which of these spots are most likely to contain the subject of the image, and to focus the camera to capture images at a distance that is associated with the spot. The camera is focused at the distance from the camera to the spot identified as being most likely to contain the subject.

The use of eye gaze monitoring has also been discussed in the context of image compression in digital imaging systems. For example, U.S. Pat. No. 6,252,989, entitled "Foveated Image Coding System and Method for Image Bandwidth Reduction" filed by Geissler on Dec. 23, 1997, discusses a technique termed "foveated imaging" in which an observer's eye gaze position is monitored in real-time and communicated to a real-time image capture system that compresses the image to maintain high frequency information near the observer's point of eye gaze and discards high frequency information in regions that are not near the observer's point of eye gaze.

Thus, cameras are known that are adapted to monitor eye gaze and use information from eye gaze monitoring equipment to make decisions about the photographic or video imaging process. However, the information leading to those decisions is discarded after the image is captured. While it is known to record eye gaze position in the non-analogous art of physiological study, such studies have typically been performed by monitoring the eye gaze position of the observer and making recordings of the eye gaze travel of the observer on a medium such as a videotape or datafile that is separate from the image being observed. This creates difficulties in associating the data with the images and in preserving the association of the image with such data over the useful life of the image.

Further, it will be appreciated that while in many circumstances eye gaze monitoring may provide an indication of which elements in images are important to a user, in other circumstances, eye gaze information may not directly indicate which elements in images are important. For example a user can fixate on an object during composition in order to ensure that an image is composed to reduce the appearance of the object in the image. Accordingly, cameras that rely upon eye gaze direction to make decisions in the image capture process may make these decisions based upon erroneous assumptions about which elements of the image are important. Better imaging decisions can be made during post capture image processing where more information about the user, the scene and/or the elements of interest are available and where more time and more complex image processing algorithms can be applied to better interpret eye gaze information.

Commonly assigned U.S. patent application Ser. No. 10/303,978, entitled, "Digital Imaging System With Eye Monitoring" filed Nov. 25, 2002, by Miller et al. describes an image capture system having an eye monitoring system that stores eye information including eye gaze direction information during an image capture sequence and associates the eye information with an image captured during the image capture sequence. In certain embodiments, context information is also captured with the eye information. The context information is also associated with the image. The eye monitoring system described therein is useful for its intended purpose and has broad application. However, some consumers prefer no to use eye monitoring systems.

Accordingly, what is needed is a simpler camera and method for determining what is important in a captured image and associating information with the captured image that indicates which portions of the captured image are important.

SUMMARY OF THE INVENTION

In one aspect of the present invention, a method is provided for determining an area of importance in an archival image. In accordance with the method, an evaluation image is captured during composition of an archival image. The evaluation image is compared with the archival image to identify common image elements and area of importance data is determined that characterizes the common image elements. The area of importance data and the archival image are associated.

In another aspect of the present invention, a method is provided for determining an area of importance in an archival image. In accordance with the method, a set of evaluation images is captured during composition of an archival image. An archival image is captured and a preliminary area of importance image is formed based upon the archival image. Portions of the area of importance image that do not correspond to the images of the set of evaluation images are extracted from the preliminary area of importance image and the remaining portion of the preliminary area of importance image are stored as an area of importance image. The area of importance image is associated with the archival image.

In still another aspect of the present invention a method for forming an area of interest image is provided. In accordance with this method an archival image is composed and a sequence of evaluation images is captured during composition. An archival image is captured. An evaluation image corresponding to the archival image is obtained. The corresponding evaluation image is compared to the sequence of evaluation images to identify common portions of the evaluation images. Area of importance data is generated indicating the portions of the archival image that correspond to the common portions of the evaluation images. The area of importance data is stored and associated with the archival image.

In still another aspect of the present invention, an imaging system is provided. The imaging system comprises an image source operable to obtain evaluation images and an archival image. A controller causes the image source to obtain a set of evaluation images and an archival image. A signal processor compares the evaluation images and the archival image to identify portions of the archival image that are common to all of the captured images. The signal processor stores area of importance data identifying the portions of the archival image that correspond to the common portions and associates the area of importance data with the archival image.

In a further aspect of the present invention, an imaging system is provided. The imaging system has an image capture system adapted to capture evaluation images and an archival image. A display system presents a series of evaluation images to a user of the imaging system during composition of an archival image. A memory is provided for storing archival and evaluation images. A processor stores the evaluation images in the memory during composition. When an archival image is captured, the processor obtains an area of importance image that corresponds to the archival image. The processor compares the area of importance image to the series evaluation images beginning with the evaluation image captured immediately prior to the capture of the archival image and continuing sequentially with additional prior evaluation images until a threshold criterion is met.

In still another aspect of the present invention an imaging system is provided. The imaging system comprises a composition trigger adapted to generate a composition signal and a capture trigger adapted to generate an archival image capture signal. An image capture system is adapted to capture evaluation images when the composition signal is generated and to capture an archival image when the archival image capture signal is generated. A processor compares the archival image to the evaluation images and identifies image elements in the archival image that correspond to image elements in each of the evaluation images. The processor is further adapted to associate area of importance data that identifies the corresponding portions of the archival image with the archival image.

In a further aspect of the present invention, an imaging system is provided. The imaging system has an image capture means for capturing an archival image and for capturing at least one evaluation image during composition of the archival image. A comparison means is provided for comparing the captured images to identify common image elements. An associating means associates data identifying the common image elements with the archival image.

BRIEF DESCRIPTION OF THE DRAWINGS

FIG. 3 is a flow diagram of one embodiment of a method of the present invention.

FIGS. 8A-8E illustrate various evaluation images captured during composition of an archival image shown in FIG. 8F.

FIGS. 9A-9E illustrate a photographic scene with various evaluation images captured during composition which are processed to yield an area of importance image shown in FIG. 9F.

DETAILED DESCRIPTION OF THE INVENTION

Figure 1:
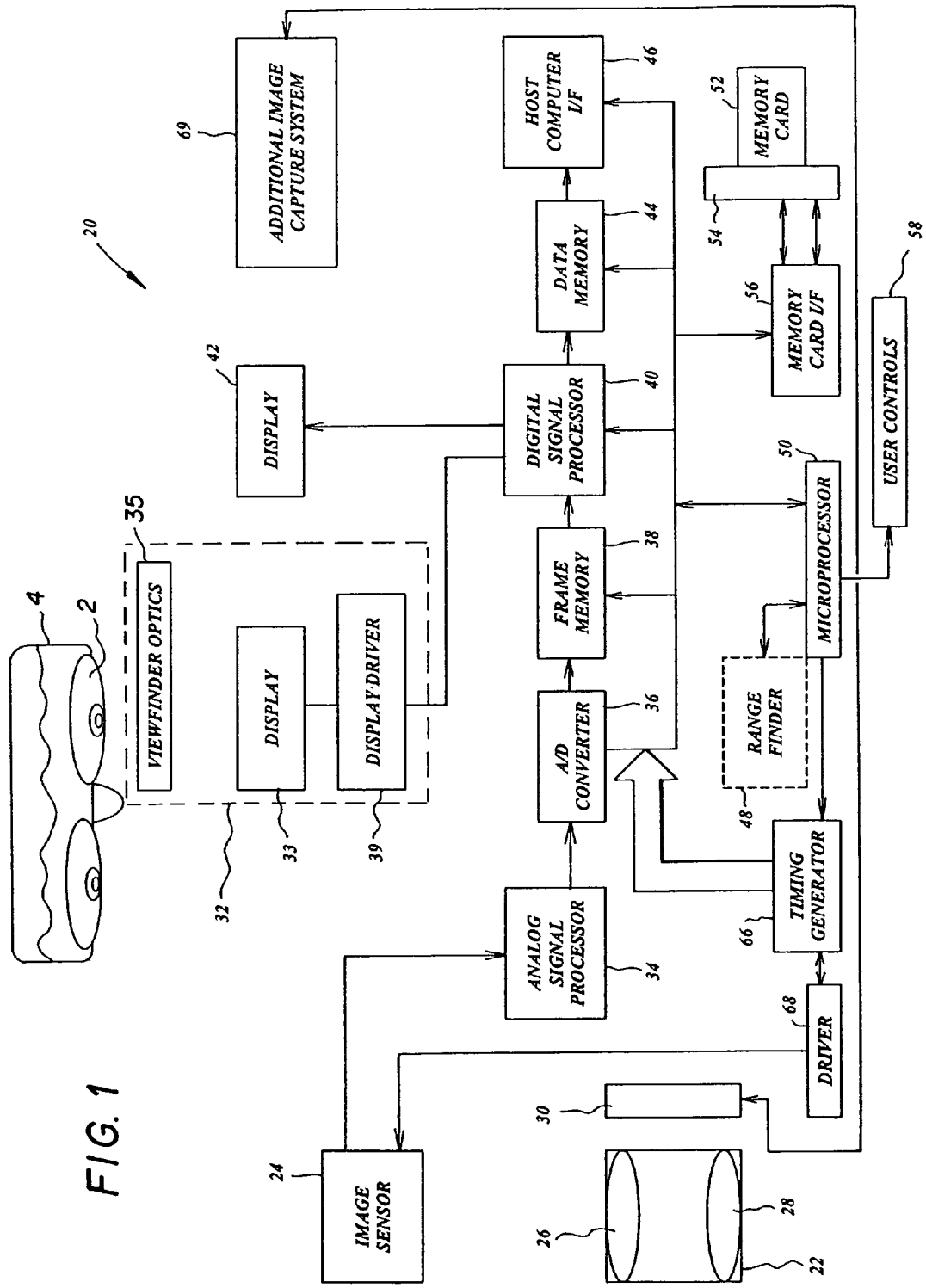
FIG. 1 is an illustration of one embodiment of an imaging system of the present invention.

FIG. 1 shows a block diagram of an embodiment of an imaging system 20 for capturing digital still images. As is shown in FIG. 1, imaging system 20 includes a taking lens unit 22, which directs light from a subject (not shown) to form an image on an image sensor 24.

The taking lens unit 22 can be simple, such as having a single focal length with manual focusing or a fixed focus. In the example embodiment shown in FIG. 1, taking lens unit 22 is a motorized 2× zoom lens unit in which a mobile element or combination of elements 26 are driven, relative to a stationary element or combination of elements 28 by lens driver 30. Lens driver 30 controls both the lens focal length and the lens focus position. A viewfinder system 32 presents images captured by image sensor 24 to user 4 to help user 4 to compose images. The operation of viewfinder system 32 will be described in greater detail below.

Various methods can be used to determine the focus settings of the taking lens unit 22. In a preferred embodiment, image sensor 24 is used to provide multi-spot autofocus using what is called the "through focus" or "whole way scanning" approach. The scene is divided into a grid of regions or spots, and the optimum focus distance is determined for each image region. The optimum focus distance for each region is determined by moving taking lens unit 22 through a range of focus distance positions, from the near focus distance to the infinity position, while capturing images. Depending on the camera design, between four and thirty-two images may need to be captured at different focus distances. Typically, capturing images at eight different distances provides suitable accuracy.

The captured image data is then analyzed to determine the optimum focus distance for each image region. This analysis begins by band-pass filtering the sensor signal using one or more filters, as described in commonly assigned U.S. Pat. No. 5,874,994 "Filter Employing Arithmetic Operations for an Electronic Synchronized Digital Camera" filed by Xie et al., on Dec. 11, 1995, the disclosure of which is herein incorporated by reference. The absolute value of the bandpass filter output for each image region is then peak detected, in order to determine a focus value for that image region, at that focus distance. After the focus values for each image region are determined for each captured focus distance position, the optimum focus distances for each image region can be determined by selecting the captured focus distance that provides the maximum focus value, or by estimating an intermediate distance value, between the two measured captured focus distances which provided the two largest focus values, using various interpolation techniques.

The lens focus distance to be used to capture the final high-resolution still image can now be determined. In a preferred embodiment, the image regions corresponding to a target object (e.g. a person being photographed) are determined. The focus position is then set to provide the best focus for these image regions. For example, an image of a scene can be divided into a plurality of sub-divisions. A focus evaluation value representative of the high frequency component contained in each subdivision of the image can be determined and the focus evaluation values can be used to determine object distances as described in commonly assigned U.S. Pat. No. 5,877,809 entitled "Method Of Automatic Object Detection In An Image", filed by Omata et al. on Oct. 15, 1996, the disclosure of which is herein incorporated by reference. If the target object is moving, object tracking may be performed, as described in commonly assigned U.S. Pat. No. 6,067,114 entitled "Detecting Compositional Change in Image" filed by Omata et al. on Oct. 26, 1996, the disclosure of which is herein incorporated by reference. In an alternative embodiment, the focus values determined by "whole way scanning" are used to set a rough focus position, which is refined using a fine focus mode, as described in commonly assigned U.S. Pat. No. 5,715,483, entitled "Automatic Focusing Apparatus and Method", filed by Omata et al. on Oct. 11, 1998, the disclosure of which is herein incorporated by reference.

In one embodiment, the bandpass filtering and other calculations used to provide autofocus in imaging system 20 are performed by digital signal processor 40. In this embodiment, imaging system 20 uses a specially adapted image sensor 24, as is shown in commonly assigned U.S. Pat. No. 5,668,597 entitled "Electronic Camera With Rapid Autofocus Upon An Interline Image Sensor", filed by Parulski et al. on Dec. 30, 1994, the disclosure of which is herein incorporated by reference, to automatically set the lens focus position. As described in the '597 patent, only some of the lines of sensor photoelements (e.g. only ¼ of the lines) are used to determine the focus. The other lines are eliminated during the sensor readout process. This reduces the sensor readout time, thus shortening the time required to focus taking lens unit 22.

In an alternative embodiment, imaging system 20 uses a separate optical or other type (e.g. ultrasonic) of rangefinder 48 to identify the subject of the image and to select a focus position for taking lens unit 22 that is appropriate for the distance to the subject. Rangefinder 48 can operate lens driver 30 directly or as is shown in the embodiment of FIG. 1, rangefinder 48 can provide data to microprocessor 50, to move one or more mobile elements 26 of taking lens unit 22. Rangefinder 48 can be passive or active or a combination of the two. A wide variety of suitable multiple sensor rangefinders 48 known to those of skill in the art are suitable for use. For example, U.S. Pat. No. 5,440,369 entitled "Compact Camera With Automatic Focal Length Dependent Exposure Adjustments" filed by Tabata et al. on Nov. 30, 1993, the disclosure of which is herein incorporated by reference, discloses such a rangefinder 48.

In the embodiment of FIG. 1, a feedback loop is established between lens driver 30 and microprocessor 50 so that microprocessor 50 can accurately set the focus position of taking lens unit 22. The focus determination provided by rangefinder 48 can be of the single-spot or multi-spot type. Preferably, the focus determination uses multiple spots. In multi-spot focus determination, the scene is divided into a grid of regions or spots, and the optimum focus distance is determined for each spot.

Image sensor 24 has a discrete number of photosensitive elements arranged in a two-dimensional array. Each individual photosite on image sensor 24 corresponds to one pixel of the captured digital image, referred to herein as an initial image. Image sensor 24 can be a conventional charge coupled device (CCD) sensor, a complementary metal oxide semiconductor image sensor and/or a charge injection device. In one example embodiment, image sensor 24 has an array of 1280×960 photosensitive elements. The photosensitive elements, or photosites, of image sensor 24 convert photons of light from the scene into electron charge packets. Each photosite is overlaid with a color filter array, such as the Bayer color filter array described in commonly assigned U.S. Pat. No. 3,971,065, entitled "Color Imaging Array" filed by Bayer on Mar. 7, 1975, the disclosure of which is herein incorporated by reference. The Bayer color filter array has 50% green pixels in a checkerboard mosaic, with the remaining pixels alternating between red and blue rows. The photosites respond to the appropriately colored incident light illumination to provide an analog signal corresponding to the intensity of illumination incident on the photosites. Various other color filters can be used. A color filter can be omitted where image sensor 24 is used to capture gray scale or so-called black and white images.

The analog output of each pixel is amplified by an analog amplifier (not shown) and are analog processed by an analog signal processor 34 to reduce the output amplifier noise of image sensor 24. The output of analog signal processor 34 is converted to a captured digital image signal by an analog-to-digital (A/D) converter 36, such as, for example, a 10-bit A/D converter which provides a 10 bit signal in the sequence of the Bayer color filter array.

The digitized image signal is temporarily stored in a frame memory 38, and is then processed using a programmable digital signal processor 40 as described in commonly assigned U.S. Pat. No. 5,016,107 filed by Sasson et al. on May 9, 1989, entitled "Electronic Still Camera Utilizing Image Compression and Digital Storage" the disclosure of which is herein incorporated by reference. The image processing includes an interpolation algorithm to reconstruct a full resolution color image from the color filter array pixel values using, for example, the methods described in commonly assigned U.S. Pat. No. 5,373,322 entitled "Apparatus and Method for Adaptively Interpolating a Full Color Image Utilizing Chrominance Gradients" filed by LaRoche et al. on Jun. 30, 1993, and U.S. Pat. No. 4,642,678 entitled "Signal Processing Method and Apparatus for Producing Interpolated Chrominance Values in a Sampled Color Image Signal" filed by Cok on Feb. 3, 1986, the disclosures of which are herein incorporated by reference. White balance, which corrects for the scene illuminant, is performed by multiplying the red and blue signals by a correction factor so that they equal green for neutral (i.e. white or gray) objects. Preferably, color correction uses a 3×3 matrix to correct the camera spectral sensitivities. However, other color correction schemes can be used. Tone correction uses a set of look-up tables to provide the opto-electronic transfer characteristic defined in the International Telecommunication Union standard ITU-R BT.709. Image sharpening, achieved by spatial filters, compensates for lens blur and provides a subjectively sharper image. Luminance and chrominance signals are formed from the processed red, green, and blue signals using the equations defined in ITU-R BT.709.

Digital signal processor 40 uses the initial images to create archival images of the scene. Archival images are typically high resolution images suitable for storage, reproduction, and sharing. Archival images are optionally compressed using the JPEG (Joint Photographic Experts Group) ISO 10918-1 (ITU-T.81). standard and stored in a data memory 44. The JPEG compression standard uses the well-known discrete cosine transform to transform 8×8 blocks of luminance and chrominance signals into the spatial frequency domain. These discrete cosine transform coefficients are then quantized and entropy coded to produce JPEG compressed image data. This JPEG compressed image data is stored using the so-called "Exif" image format defined in the Exchangeable Image File Format version 2.2 published by the Japan Electronics and Information Technology Industries Association JEITA CP-3451. The Exif format archival image can also be stored in a memory card 52. In the embodiment of FIG. 1, imaging system 20 is shown having a memory card slot 54 which holds a removable memory card 52 and has a memory card interface 56 for communicating with memory card 52. An Exif format archival image and any other digital data can also be transmitted to a host computer (not shown), which is connected to imaging system 20 through a host computer interface 46. Host computer interface 46 can be for example, an optical, radio frequency or other transducer that converts image and other data into a form that can be conveyed to a host computer or network (not shown) by way of an optical signal, radio frequency signal or other form of signal.

Digital signal processor 40 also creates smaller size digital images based upon the initial images. These smaller sized images are referred to herein as evaluation images. Typically, the evaluation images are lower resolution images adapted for display on viewfinder display 33 or exterior display 42. Viewfinder display 33 and exterior display 42 can comprise, for example, a color or gray scale liquid crystal display (LCD), organic light emitting display (OLED) also known as an organic electroluminescent display (OELD) or other type of video display.

In an image capture sequence, digital signal processor 40 can use the initial images to generate evaluation images, archival images or both. As used herein, the term "image capture sequence" comprises at least an image composition phase and an image capture phase and can optionally also include a verification phase.

During composition, microprocessor 50 sends signals to a timing generator 66 indicating that images are to be captured. Timing generator 66 is connected, generally, to the elements of imaging system 20, as shown in FIG. 1, for controlling the digital conversion, compression, and storage of the image signal. Image sensor 24 is driven by timing generator 66 via a sensor driver 68. Microprocessor 50, timing generator 66 and sensor driver 68 cooperate to cause image sensor 24 to collect charge in the form of light from a scene for an integration time that is either fixed or variable. After the integration time is complete, an image signal is provided to analog signal processor 34 and converted into initial images which can be used as evaluation images or archival images as is generally described above. A stream of initial images is captured in this way and digital signal processor 40 generates a stream of evaluation images based upon the initial images. The stream of evaluation images is presented on viewfinder display 33 or exterior display 42. User 4 observes the stream of evaluation images and uses the evaluation images to compose the image. The evaluation images can be created as described using, for example, resampling techniques such as are described in commonly assigned U.S. Pat. No. 5,164,831 "Electronic Still Camera Providing Multi-Format Storage Of Full And Reduced Resolution Images" filed by Kuchta et al., on Mar. 15, 1990, the disclosure of which is herein incorporated by reference. The evaluation images can also be stored in data memory 44.

Imaging system 20 typically enters the capture phase when user 4 depresses shutter trigger button 60. However, the capture phase can also be entered in other ways, for example, in response to a timer signal from microprocessor 50 or a remotely received signal. During the capture phase, microprocessor 50 sends a capture signal causing digital signal processor 40 to select an initial image and to process the initial image to form an archival image. During the verification phase, a corresponding evaluation image is also formed and the corresponding evaluation image is supplied to viewfinder display 33 or exterior display 42 and is presented for a period of time. This permits user 4 to verify that the appearance of the captured archival image is acceptable.

In one alternative embodiment the initial images that are captured by image sensor 24 are captured in the form of an archival images which are then modified for use as evaluation images. In another alternative embodiment, imaging system 20 has more than one system for capturing images. For example, in FIG. 1 an optional additional image capture system 69 is shown. This additional image capture system 69 can be used for capturing archival images. The additional image capture system 69 can comprise an image capture system that records images using a high resolution digital imager or a photographic element such as a film or plate. Where an additional image capture system 69 is used, the images captured by image sensor 24 can be used as the evaluation images and an evaluation image corresponding to the archival image can be obtained and compared with the evaluation image obtained during image composition.

Figure 2:
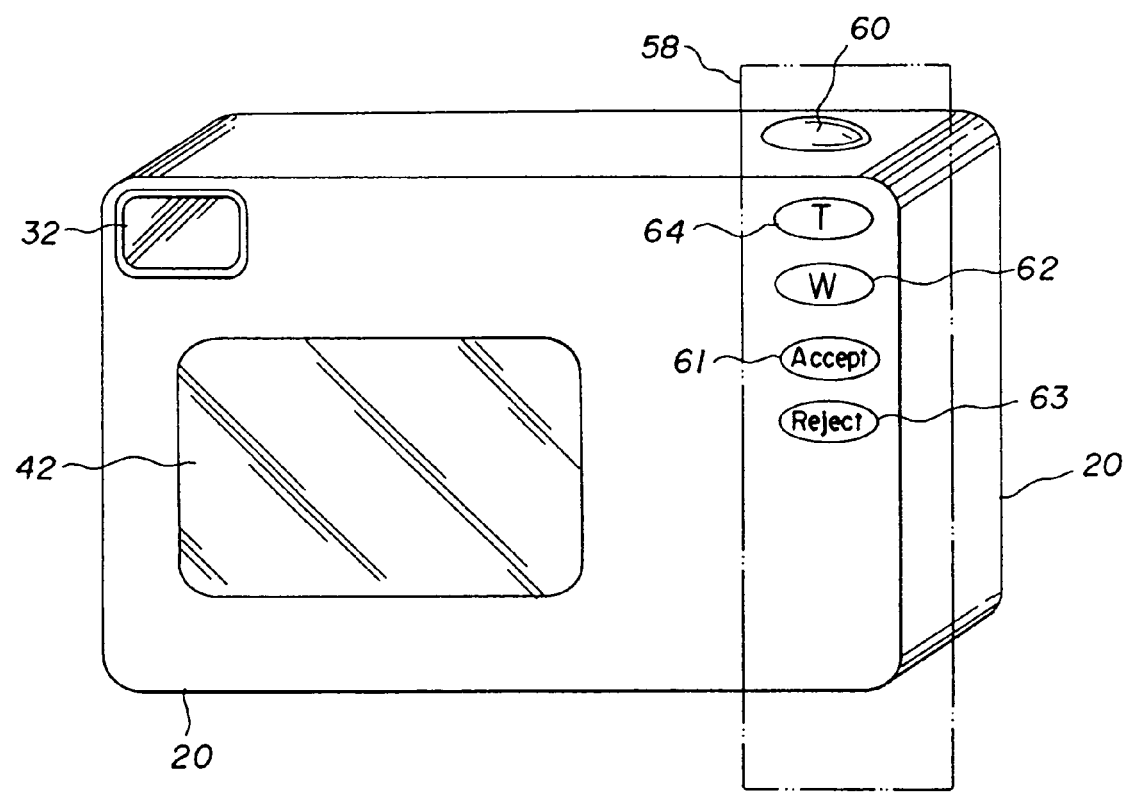
FIG. 2 is an illustration of a back view of the imaging system of FIG. 1.
Figure 4B:
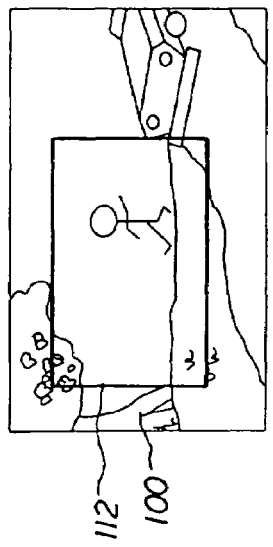
FIGS. 4A-4F illustrate scene image information captured by a sequence of evaluation images during composition of an archival image shown in 4F.
Figure 4D:
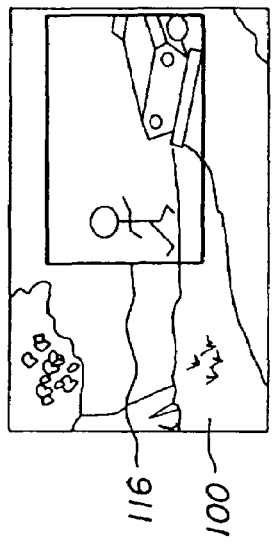
Figure 4F:
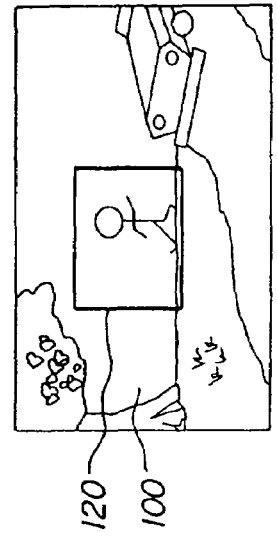
Figure 4A:
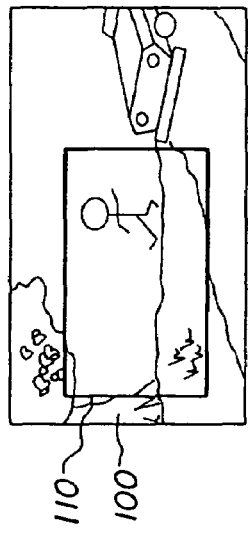
Figure 4C:
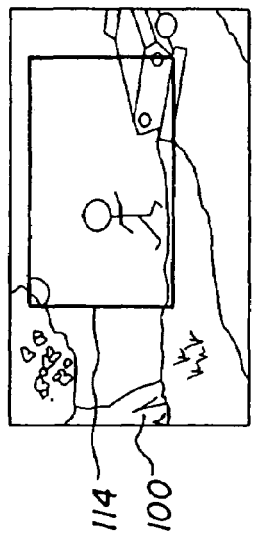
Figure 4E:
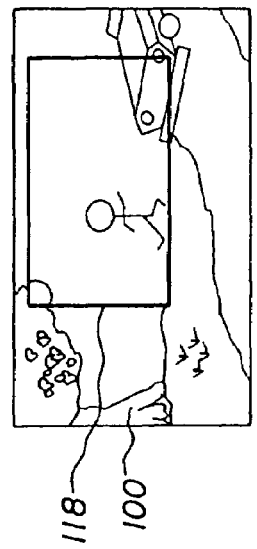

Imaging system 20 is controlled by user controls 58, some of which are shown in more detail in FIG. 2. User controls 58 can comprise any form of transducer or other device capable of receiving input from user 4 and converting this input into a form that can be used by microprocessor 50 in operating imaging system 20. For example, user controls 58 can comprise touch screen, four way, six way, eight way rocker switches, joysticks, styluses, track balls, voice recognition systems, gesture recognition systems and other such systems. In the embodiment shown in FIG. 2, user controls 58 include shutter trigger button 60 which initiates a picture taking operation by sending a signal to microprocessor 50 indicating user 4's desire to capture an image. Microprocessor 50 responds to this signal by sending a capture signal to digital signal processor 40 as is generally described above. A "wide" zoom lens button 62 and a "tele" zoom lens button 64, are provided which together control both a 2:1 optical zoom and a 2:1 digital zoom feature. The optical zoom is provided by taking lens unit 22, and adjusts the magnification in order to change the field of view of the focal plane image captured by the image sensor 24. The digital zoom is provided by the digital signal processor 40, which crops and resamples the captured image stored in the frame memory 38. When user 4 first turns on imaging system 20, the zoom lens is set to the 1:1 position, so that all sensor photoelements are used to provide the captured image, and the taking lens unit 22 is set to the wide angle position. In a preferred embodiment, this wide angle position is equivalent to a 40 mm lens on a 35 mm film camera. This corresponds to the maximum wide angle position.

When the user then depresses the "tele" zoom lens button 64, taking lens unit 22 is adjusted by microprocessor 50 via the lens driver 30 to move taking lens unit 22 towards a more telephoto focal length. If user 4 continues to depress the "tele" zoom lens button 64, the taking lens unit 22 will move to the full optical 2:1 zoom position. In a preferred embodiment, this fall telephoto position is equivalent to a 40 mm lens on a 35 mm film camera. If user 4 continues to depress the "tele" zoom lens button 64, the taking lens unit 22 will remain in the full optical 2:1 zoom position, and digital signal processor 40 will begin to provide digital zoom, by cropping (and optionally resampling) a central area of the image. While this increases the apparent magnification of the camera, it causes a decrease in sharpness, since some of the outer photoelements of the sensor are discarded when producing the archival image. However, this decrease in sharpness would normally not be visible on the relatively small viewfinder display 33 and exterior display 42.

For example, in imaging system 20 of FIG. 1, the captured image is derived from a high resolution image sensor 24, having for example 1280×960 photosites, corresponding to about 1.25 megapixels. The term resolution is used herein to indicate the number of picture elements used to represent the image. Exterior display 42, however, has lower resolution providing, for example, 320×240 elements, which correspond to about 0.08 megapixels. Thus, there are 16 times more sensor elements than display elements. Accordingly, it is necessary to resample the initial image into an evaluation image having a suitably small image size so that it can properly fit on viewfinder display 33 or exterior display 42. This resampling can be done by using low pass filtering, followed by sub-sampling, or by using bilinear interpolation techniques with appropriate anti-aliasing conditioning. Other techniques known in the art for adapting a high resolution image for display on a relatively low resolution display can alternatively be used.

The resampling of the captured image to produce an evaluation image having fewer pixels (i.e. lower resolution) than the captured image is performed by digital signal processor 40. As noted earlier, digital signal processor 40 can also provide digital zooming. In the maximum 2:1 setting, digital signal processor 40 uses the central 640×480 sensor area to provide the archival image by interpolating this central area up to 1280×960 samples.

Digital signal processor 40 can also modify the evaluation images in other ways so that the evaluation images match the appearance of a corresponding archival image when viewed on viewfinder display 33 or exterior display 42. These modifications include color calibrating the evaluation images so that when the evaluation images are presented on viewfinder system 32 or exterior display 42, the displayed colors of the evaluation image appear to match the colors in the corresponding archival image. These and other modifications help to provide user 4 with an accurate representation of the color, format, scene content and lighting conditions that will be present in a corresponding archival image.

As noted above, because evaluation images are displayed using an electronic display that has lower resolution than a corresponding archival image, an evaluation image may appear to be sharper when viewed through viewfinder display 33 or exterior display 42 than it will appear when the archival image is printed or otherwise displayed at higher resolution. Thus, in one optional embodiment of the present invention, each evaluation image can be modified so that areas that will appear out of focus in a corresponding archival image could appear to be out of focus when viewed on an electronic display such as exterior display 42. Moreover, when the digital zoom is active, the entire image is softened, but this softening would normally not be visible in exterior display 42. For the example in imaging system 20 of FIG. 1, exterior display 42 can be a display having 320×240 pixels while the archival image is provided using a sensor area of 640×480 pixels in the maximum digital zoom setting. Thus, the evaluation image displayed on exterior display 42 after normal resizing will appear suitably sharp. However, the archival image will not produce an acceptably sharp print. Therefore, a resampling technique can be used which creates an evaluation image having 320×240 pixels, but having reduced apparent sharpness when the maximum digital zoom setting is used.

It will be appreciated that the apparent sharpness of a print or other tangible output that is made from the archival image is also a function of the size of the rendered image. As described in commonly assigned U.S. patent application Ser. No. 10/028,644 entitled "Method and Imaging system for Blurring Portions of a Verification Image To Show Out of Focus Areas in a Captured Archival Image", filed by Belz, et al. on Dec. 21, 2001, imaging system 20 can optionally have an input (not shown) for receiving a signal indicating the expected size of the output and can adjust the apparent sharpness of the evaluation image accordingly and/or provide a warning.

The use of imaging system 20 to determine an areas of importance in an archival image will now be described with reference to FIGS. 3, 4A-4F, 5 and 6. FIG. 3 shows a flow diagram of a first embodiment of a method in accordance with the present invention. As is shown in FIG. 3, imaging system 20 begins the process of capturing an archival image by entering an image composition mode (step 70). Imaging system 20 can be caused to enter the image composition mode in a variety of ways. For example, the image composition mode can be entered when microprocessor 50 detects that shutter trigger button 60 is moved to a half-depression or other non-fully depressed position. Alternatively, a detector (not shown) can generate a signal that microprocessor 50 can detect and use as a flag for entering the image capture mode in response to the positioning of a mode selection switch (not shown). In another alternative, imaging system 20 can have sensors (not shown) detect that imaging system 20 is being held in a way that is associated with image composition. In still another alternative, imaging system 20 can enter the image composition mode whenever a detector (not shown) detects the presence of an eye 2 of user 4 that is positioned to observe images in viewfinder system 32.

Evaluation images that are captured during composition of a scene 100 containing a subject 102 as illustrated in FIGS. 4A-4E are obtained (step 72). The evaluation images can be obtained from the initial images that are captured and displayed on viewfinder display 33 or exterior display 42 as described above to aid user 4 when composing the archival image. The evaluation images are stored, for example, in frame memory 38, data memory 44 or memory card 52. The number of evaluation images that are stored during composition can be one or more than one (step 74).

In one embodiment, a predefined number of evaluation images are stored during composition. In other embodiments, a memory such as frame memory 38 can provide a first in last out buffer containing a sequence of a predetermined number of evaluation images captured during composition. In this embodiment, as the image composition process begins, the buffer is filled with stored evaluation images. If the composition process continues after the buffer is filled, newly captured evaluation images replace the oldest captured evaluation images. This process continues until an archival image is captured. In this way, the buffer contains a sequence of evaluation images that captured over a period of time leading up to the capture the archival image. In still another embodiment, all evaluation images captured during composition are stored. In still another embodiment, only those evaluation images that are captured during a predetermined period of time prior to capture of the archival image are stored. Other useful evaluation image storage strategies can also be used.

In the illustrations of FIGS. 4A-4F and 5, the captured evaluation images include evaluation images 110, 112, 114, 116, and 118 formed, generally, as is described above. Any number of evaluation images greater than one can be used.

An archival image is then obtained (step 76). The archival image is typically captured when microprocessor 50 detects that shutter trigger button 60 has been depressed to a full depression position as is generally described above. The archival image can be captured and stored in, for example, in frame memory 38, or in data memory 44 or memory card 52 (step 78).

Digital signal processor 40 compares the archival image to at least one of the evaluation images to identify areas of the archival image that contain image elements that are common to the captured evaluation images. (step 80). The resolution of the archival image maybe adjusted to facilitate comparison. That is to say that an image matching the resolution of the evaluation images may be created. The archival image can be compared to all of the stored evaluation images or a sample of the stored evaluation images. Various sampling methods can be used. For example, only those evaluation images that were captured during the last few seconds before capture of the archival image can be used. Alternatively, every second or every fourth stored evaluation image can be compared, or some other like criterion can be used. Other meaningful statistical sampling patterns can be used such as those that use a weighted ratio of samples selected from the group of evaluation images.

In another example, the evaluation images can be compared to detect shifts in the field of view of the evaluation images that are smaller than a maximum threshold and closest in time to the capture of the archival image with only the evaluation images meeting these conditions used for comparison. This approach has the advantage of reducing the number of false readings that might occur because of large shifts in the field of view of imaging system 20 that often happen during the initial phases of archival image composition, and/or that may occur as a result of adjusting a zoom lens setting.

The evaluation images and the archival image are compared to determine areas in the images that contain the same image elements (step 80). This comparison can also determine areas in the images that contain substantially similar but not identical image elements. This may be necessary due to subject motion during the composition phase. The images can be compared on an image element by image element basis. Alternatively, key elements or patterns of elements representing objects in the archival image can be identified and the common areas can be determined by searching for these key elements or patterns of elements. Conventional image comparison algorithms can be used for this purpose. For example, determination of the relative motion of the camera between compared images can be determined by using the image comparison algorithms used in creating Motion Picture Export Group-2 compressed video streams.

Figure 5:
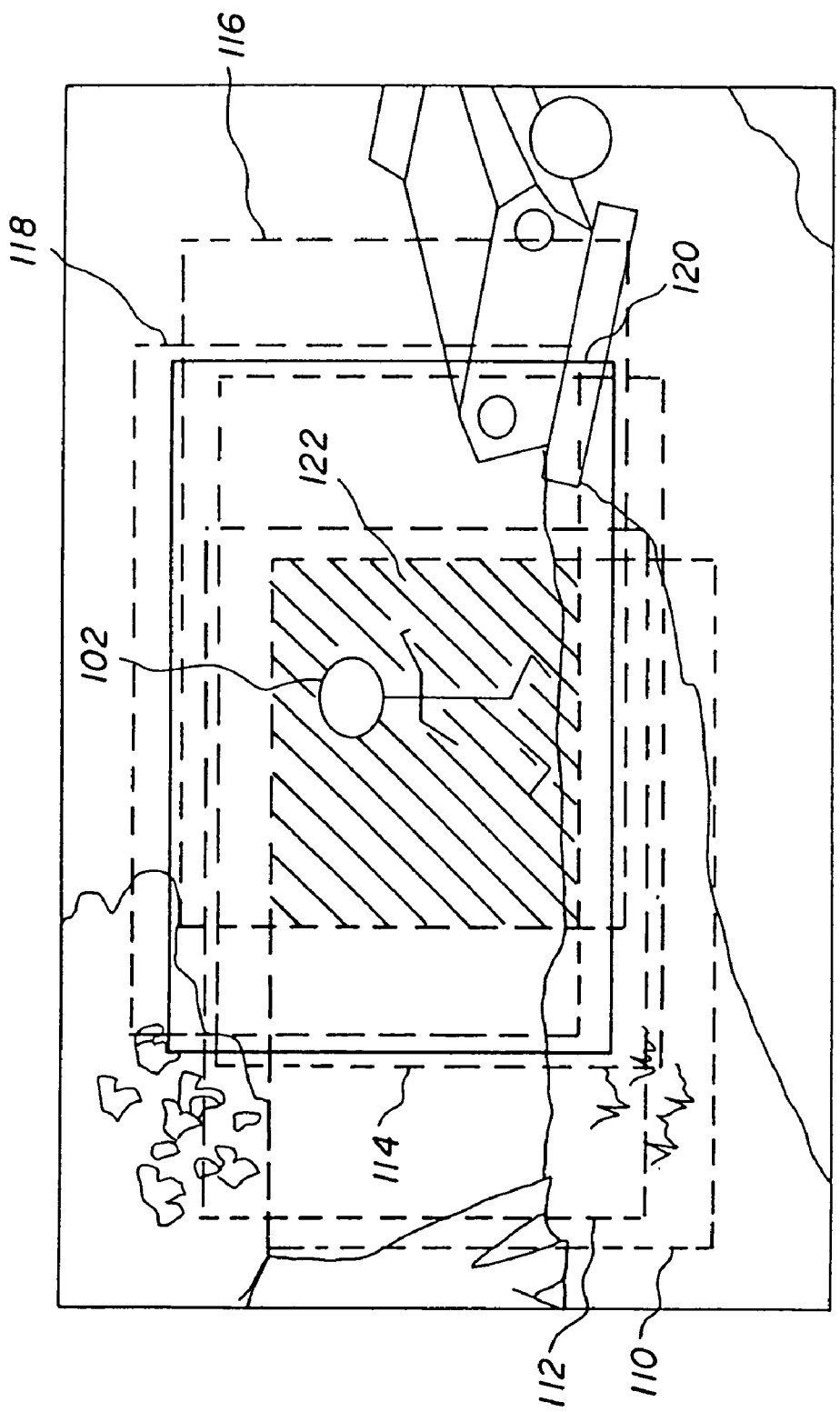
FIG. 5 illustrates the scene with the captured evaluation images, archival image and the area of importance.
Figure 6:
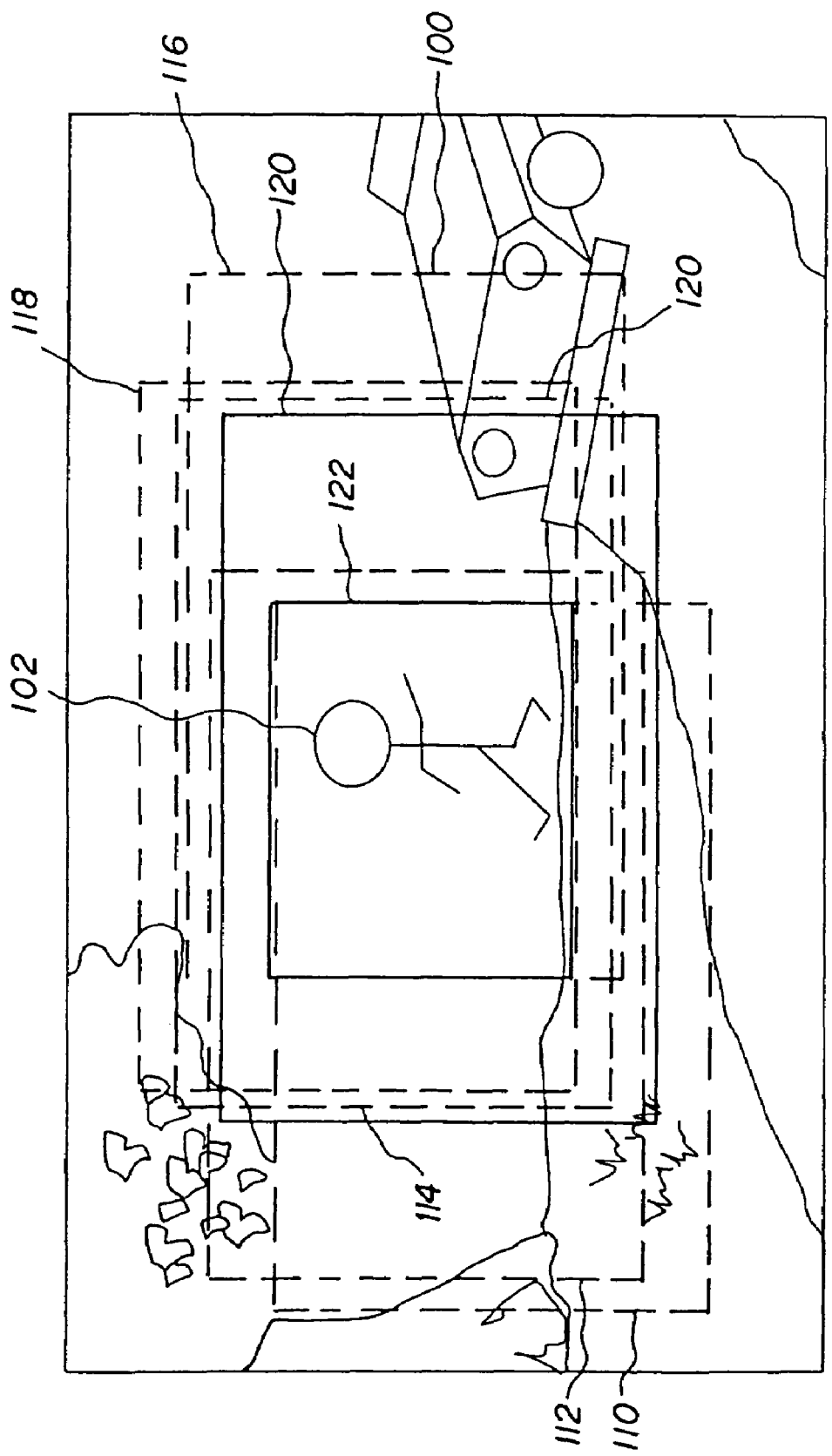
FIG. 6 illustrates the archival image with the area of importance displayed therein, and the evaluation images shown in phantom.

FIGS. 5 and 6 illustrate the results of such a comparison. In this embodiment archival image 120 is compared to a set of evaluation images 110, 112, 114, 116 and 118. The image elements that are common to each of the evaluation images and to the archival image are contained in an area of importance 122. The area of importance 122 in this illustration is determined to be the area that contains image information that is common to each of evaluation images 110, 112, 114, 116, and 118 and the archival image 120.

Area of importance data that characterizes the common image elements is then determined (step 84). The area of importance data identifies an area of the archival image that contains the area of importance. The area of importance data can take any number of forms. In a first embodiment, the area of importance data can comprise image metadata containing a set of coordinates that identifies the location of the common image elements within the archival image. In another embodiment, an archival image can be divided into regions and the area of importance can be associated with one of the regions. In this embodiment, the area of importance data can comprise a region designation. In still another embodiment, the area of importance data can comprise information that identifies one or more objects in the archival image that are within the area of importance. For example, as is illustrated in FIGS. 5 and 6, subject 102 is located in the common image elements. In this illustration, the area of importance metadata can comprise an indication that an object in the image, appearing to be a person, is the subject of the image.

In a further embodiment, the area of importance data comprises an area of importance image. The area of importance image can take many forms. For example, the area of importance image can comprise an edge map image that can be mapped onto the archival image to separate area of importance from other areas of the archival image. Alternatively, the area of importance image can also comprise a copy of the archival image that includes the area of importance. The area of importance image can also comprise an image that has the appearance of the area of importance in the archival image but is processed or stored in a different manner such as having a lower resolution, higher compression ratio and/or reduced color gamut in order to reduce the stored size of the image. In a further embodiment, the area of importance image can be processed so that it has a distinctive appearance that contrasts with the appearance of the archival image.

Although shown as a rectangular space in the illustrations of FIGS. 5 and 6, it will be appreciated that the common image elements may be contained within an area of importance 122 having any of a number of other forms.

The area of importance data is associated with the archival image (step 84). In one embodiment, the step of associating area interest data with the archival image comprises storing the area of importance data with the archival image in a common digital file. For example, area of importance data can be stored within one or more application segments in a JPEG file in accordance with the JPEG standard format published by the International Standards Organization, ISO 10918-1 (ITU-T.81). The area of importance data in the application segment can also be recorded as Tagged Image File Format tag, as defined in the Exchangeable Image File Format version 2.2 published by the Japan Electronics and Information Technology Industries Association JEITA CP-3451. The Tagged Image File Format tags can include both standard prior-art metadata defined in the EXIF standard, and metadata providing the area of importance data described earlier.

Alternatively, the step of associating area of importance data with the archival image can comprise storing the archival image in a form having a stored image resolution in the area of importance data that is higher than the stored image resolution in the remainder of the archival image. In another alternative, the step of associating the area of importance data with the archival image can also comprise storing the identified area of importance data at a compression ratio that is lower than the compression ratio used to store the remainder of the archival image.

In still another alternative of this type the step of associating the area of importance data with the archival image can comprise recording image data representing the area of importance using a different color, gamut, tone or other color settings that are detectably different from those used in other areas of the image. In this regard, it will be appreciated that, many minor forms of color adjustments can be made to image information within a digital image file that are easily detected using digital image analysis algorithms but that cannot be readily observed when the image is recorded. In one simple example of this, more digital bits e.g. 48 bits can be used to store image information that is within the area of importance data in the digital image than are used to record image information in areas outside of the area of importance e.g. 30 bits. At these levels, the difference in bit depth is not inherently apparent to an observer of an image however, the difference in bit depth would readily be apparent to a digital image processor. Alternatively, the color adjustments can be made in a manner which are apparent to an observer of the archival image. For example, portions of the archival image that are within the area of importance data which can be represented by color image information with portions of the archival image that are outside of the area of importance can be represented by black and white image information.

In still another embodiment, area interest data can be recorded within the archival image in the form of visible markings, visible information, and/or encoded in the form of optical water marks which comprise information that is encoded in the archival image in a form that is not readily apparent to a human observer of the image but that can be extracted from the image by an appropriate image processor.

In a further alternative embodiment, area of importance data can be stored in any database or on a server or other form of memory with information recorded in the area of importance data that indicates that the area interest data is associated with a particular archival image. Alternatively, the area of data information can be stored and information can be recorded in association with the archival image indicating the location of the area of importance data.

Where the archival image is captured using additional image capture system 69 such as a photochemical image capture system that records images on a photosensitive element, area of importance data can be associated with the archival image by optically encoding the area interest data onto the image in either a visible or nonvisible form as is done the art. Alternatively, area of importance data can be recorded onto photosensitive elements having a magnetic layer adapted to receive information such as for example, films that comply with the requirements of the Advanced Photographic System such as Advantix® brand films sold by Eastman Kodak Company, Rochester, N.Y., U.S.A. In still another alternative, the area interest data can be recorded on an electronic memory that is associated with the photosensitive element. In a further embodiment, photosensitive element identification information such as a photosensitive identification number and image frame number can be extracted from the film, stored with the area of importance information and transferred to a database or other storage facility.

Figure 7:
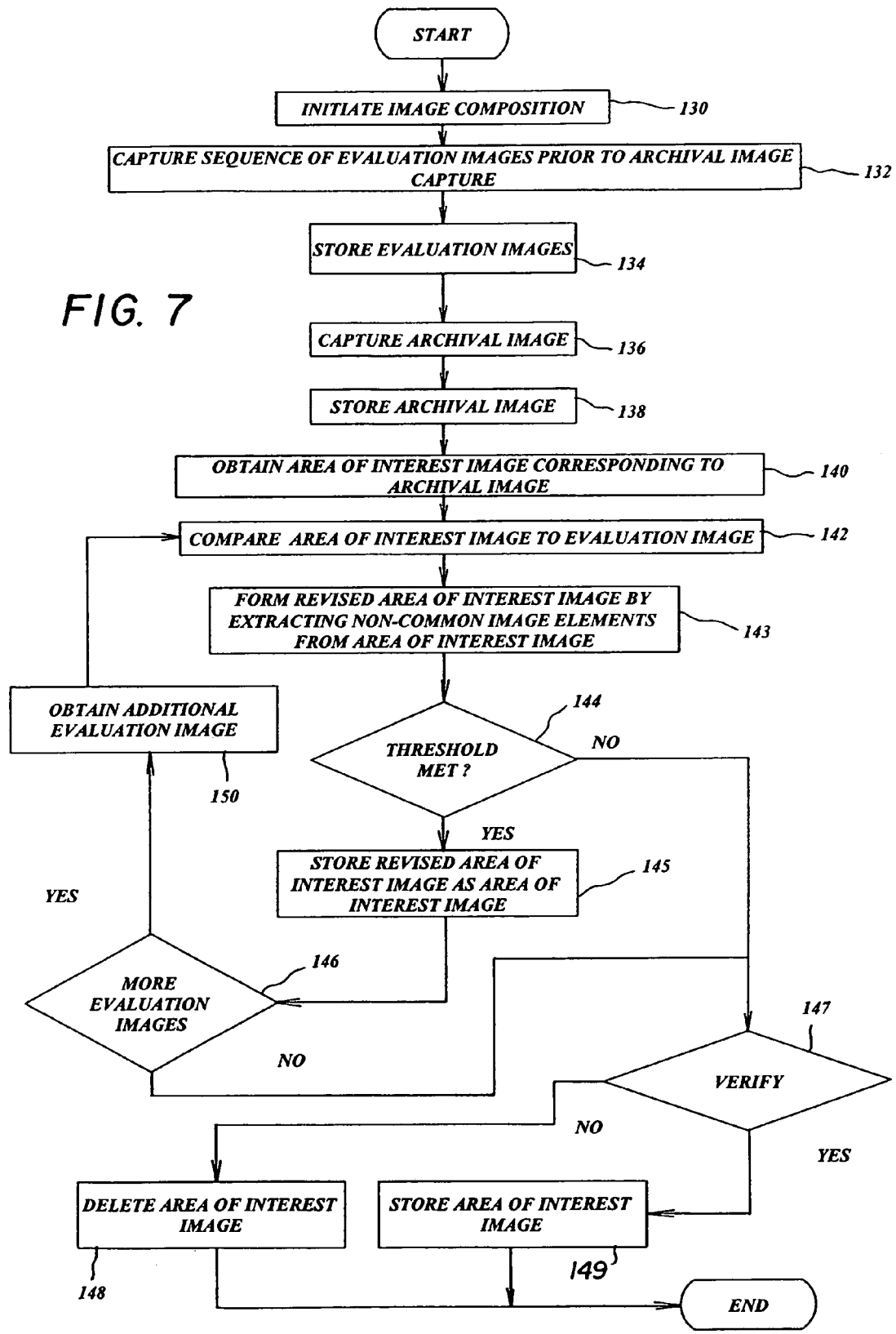
FIG. 7 is a flow diagram of another embodiment of a method of the present invention.

FIG. 7 shows a flow diagram of another embodiment of the method of the present invention. The method begins when image composition is initiated (step 130). As illustrated in FIGS. 8A-8E during the image composition evaluation images 151 152, 154, 156, and 158 are captured (step 132) in sequence over a period of time preceding the capture of the archival image 162 and stored (step 134). Archival image 160 is then captured (step 136) and stored (step 138). An area of importance image corresponding to the archival image is then obtained (step 140). The area of importance image is then compared (step 142) to the sequence of the evaluation images. In this embodiment the area of importance image is compared to each individual evaluation image in the sequence of evaluation images beginning with the evaluation image 158 that is captured immediately prior to the capture of the archival image and continuing with additional prior images in reverse sequence, e.g. image 156, image 154, image 152 etc. With each comparison, a revised area of importance image is formed (step 143). The revised area of importance image is compared to a threshold condition (step 144). When the threshold condition is met, the revised area of interest image is stored (step 145) as an area of interest image. A determination is then made as to whether more evaluation images are available for comparison (step 146). The revised area of importance image is stored as the area of importance image and the comparison process continues until the identified common image elements fail to meet the threshold condition (step 144) or until the archival image has been compared to each of the sequence of evaluation images (step 146).

The threshold condition can be one of many conditions each intended to ensure that the area of importance that is determined by the comparison step provides a meaningful area of importance indication. An example of a predetermined condition is the size of the area of importance image. The threshold condition can take other forms, for example the threshold condition can define a minimum horizontal space for the area of importance, a minimum vertical space for the area of importance or both. The threshold can also take the form of a predefined portion of the overall image space of the area of importance image, a predefined shape or a predefined distribution pattern. Additionally, the threshold condition can be quantified in terms of time before acquisition of the archival image or the number of evaluation images captured immediately before capture of the archival image.

As is illustrated in FIG. 8, in one embodiment, the archival image is compared to the sequence of the evaluation images beginning with the evaluation image that is captured at time t-1, immediately prior to the capture of archival image. This comparison yields a preliminary area of importance image. The preliminary area of importance image is then compared to additional evaluation images in reverse sequence. With each comparison, image elements of the preliminary area of importance that are not found within the evaluation image with which the preliminary area of importance is compared are extracted from the area of preliminary area of importance image to form a revised area of importance image. The size of the revised preliminary area of importance image is monitored. Where it is determined the revised area of importance image has a size that is below a threshold, then the revised area of importance image is discarded and the preliminary area of importance image used in the comparison is determined to be the area of importance image.

As is shown in FIGS. 8A-8F, an area of importance image 162 corresponding to an archival image 160 captured at time t is obtained (step 140). Area of importance image 162 is compared to evaluation image 158, which was captured immediately before the capture of the archival image 160, at time t-1 (step 142). As a result of this comparison, image elements that are not common to both area of importance image 162 and evaluation image 158 are identified. The non-common elements are extracted from area of importance image 162 to yield a revised area of importance image 164 (step 143). A determination is made as to whether revised area of importance image 164 meets a threshold condition that is shown as minimum size threshold 170 (step 144). When revised area of importance image 164 meets the minimum size threshold 170 the revised area of importance image 164 is stored as the area of importance image (step 145). If more evaluation images are available, (step 146) an additional evaluation image is obtained (step 150) and the process returns to the step of comparing the preliminary area of importance image to the next evaluation image, evaluation image 156, captured at time t-2 (step 142).

The area of importance image, now image 162, is then compared to evaluation image 156 to identify image elements that are not common to both evaluation image 156 and area of importance image 162. The non-common elements are extracted from area of importance image 162 to yield a further revised area of importance image 164 as is shown in FIG. 8D (step 143). A determination is then made as to whether revised area of importance image 164 meets the minimum size threshold 170 (step 144). The revised area of importance image 164 is stored as the area of importance image (step 145). If more evaluation images area available (step 146) an additional evaluation image is obtained (step 150) and the process returns to the step of comparing the revised area of importance image 164 to the next evaluation image, evaluation image 154, captured at time t-3 (step 142).

As a result of this comparison, image elements that are not common to evaluation image 154 and area of importance image 164 are identified (step 142). Then non-common image elements are extracted from revised area of importance image 164 to yield a further revised area of importance image 166 as is shown in FIG. 8C (step 143). A determination is then made as to whether revised area of importance image 166 meets the minimum size threshold 170 (step 144). The revised area of importance image 166 is stored as the area of importance image (step 145). If more evaluation images area available (step 146) an additional evaluation image is obtained (step 150) and the process returns to the step of comparing the revised preliminary area of importance image 164 to the next evaluation image, evaluation image 152, captured at time t-4 (step 142).

The area of importance image, now image 166, is then compared to evaluation-image 152 captured at time t-4 (step 142) and non-common image elements are extracted from revised area of importance image 166 which yields a further revised area of importance image 168 as is shown in FIG. 8B. A determination is then made as to whether revised area of importance image 168 meets the minimum size threshold 170. Here it is determined that the minimum size threshold 170 is not met.

When one of the threshold conditions is not met or when the archival image has been compared to all of the evaluation images, an optional verification step (step 147) can be performed. In this step, user 4 is shown the area of interest image. The archival image is displayed and the area of importance containing the common elements is indicated. User 4 can use an accept button 61 such as the one shown in FIG. 2 to accept the automatic designation of the indicated area of importance or can reject the automatic designation by pressing a reject button 63 such as the one shown in FIG. 2 or otherwise use user controls 58 to reject the determined area of importance. Where user 4 rejects the automatic designation, the area of importance image can be deleted (step 148). Where user 4 accepts the automatic designation, then the area of importance image can be stored with the archival image (step 149).

In one embodiment of the invention, user 4 of imaging system 20 can have input as to which evaluation images are used to define the area of importance. For example, shutter trigger button 60 can be used to designate when evaluation images are to be captured and used to determine area of importance. In this example, evaluation images are captured when shutter trigger button 60 is moved to a partially depressed position. If shutter trigger button 60 is released without depressing fully, then no archival image is captured, and the evaluation images are discarded. If shutter trigger button 60 is fully depressed, then an archival image is captured, and evaluation images captured between the time that shutter trigger button 60 is moved from the partial depression to the full depression position are stored and used for determining the area of importance.

In this manner user 4 can determine the set of images that are to be used in determining the area of importance. This process is illustrated in FIGS. 9A-9E which each show a photographic scene 200 with a person 202 therein. In this illustration, user 4 begins composition of an archival image of scene 200 by moving shutter trigger button 60 to the half-depression position. Composition begins with user 4 aiming imaging system 20 to capture images of a field of view that truncates person 202 as is shown in FIG. 9A. An evaluation image 210 of the field of view is presented and user 4 then attempts to correct this by moving the imaging system however an evaluation image 212 reveals that this adjustment also truncates person 202. At this point user 4 can release the shutter trigger button 60 causing the evaluation images 210 and 212 to be discarded. User 4 then returns shutter trigger button 60 to the half-depression position and captures evaluation images 214 and 216 depicted in FIGS. 9C and 9D. Finally user 4 moves shutter trigger button 60 to the full depression position to capture archival image 218 depicted in FIG. 9E. Common image elements in images 214, 216 and 218 are identified as an area of importance 220 shown in FIG. 9F.

In an alternative embodiment of this type, shutter trigger button 60 is movable between a first depression position, a second depression position and a full depression position. When shutter trigger button 60 is moved to the first depression position, the camera system begins capturing and presenting evaluation images, however, these evaluation images are not stored for use in determining an area of importance. When shutter trigger button 60 is moved to the second depression position, microprocessor 50 causes captured evaluation images to be stored for use in determining the area of importance. Microprocessor 50 continues storing the evaluation images until shutter trigger button 60 is returned to the first depression position or moved to the full depression position. Where shutter trigger button 60 is returned to the first depression position, the stored evaluation images are deleted. Where shutter trigger button 60 is moved to the full depression position, the stored evaluation images are used to determine an area of importance in the archival image. It will be appreciated that other user controls 58 can be supplied that can be used to allow user 4 to determine which evaluation images are to be stored evaluation images for use in determining an area of importance image or other form of area of importance data.

In the above described embodiments, imaging system 20 has been described as comprising a camera having a still image capture system. However, in other embodiments, imaging system 20 can comprise an image processing system such as a video camera with a tagging feature for designating still images, personal computer, Kodak Image Maker™ kiosk, manufactured by Eastman Kodak Company, Rochester, N.Y., U.S.A., an imaging appliance or similar device having an image source such as a memory or a communication interface adapted to obtain evaluation images and archival images captured by a separate image capture device and to provide theses images to microprocessor 50.

The invention has been described in detail with particular reference to certain preferred embodiments thereof, but it will be understood that variations and modifications can be effected within the spirit and scope of the invention.

PARTS LIST 2 eye
4 user
20 imaging system
22 taking lens unit
24 image sensor
26 elements
28 elements
30 lens driver
32 viewfinder system
33 viewfinder display
34 analog signal processor
35 viewfinder optics
36 A/D converter
38 frame memory
39 display driver
40 digital signal processor
42 exterior display
44 data memory
46 host computer interface
48 rangefinder
50 microprocessor
52 memory card
54 memory card slot
56 memory card interface
58 user controls
60 shutter trigger button
61 accept button
62 "wide" zoom lens button
63 accept button
64 "tele" zoom lens button
65 reject button
66 timing generator
67 reject button
68 sensor driver
69 additional image capture system
70 enter image composition mode step
72 obtain at least one evaluation image
74 temporarily store evaluation image step
76 obtain archival image step
78 store archival image step
80 compare step
82 determine area of importance step
84 associating step
100 scene
102 subject
110 evaluation image
112 evaluation image
114 evaluation image
116 evaluation image
118 evaluation image
120 archival image
122 area of importance
130 initiate composition step
132 capture evaluation image step
134 store evaluation image step
136 capture archival image step
138 store evaluation image step
140 obtain area of importance step
142 compare step
143 form revised area of importance step 144 threshold step
144 store revised area of importance step
146 determine remaining images step
147 verification step
148 delete area of importance step
149 store area of importance step
150 obtain additional evaluation step
151 evaluation image
152 evaluation image
154 evaluation image
156 evaluation image
158 evaluation image
160 archival image
162 area of importance image
164 revised area of importance image
166 revised area of importance image
168 revised area of importance image
170 minimum size threshold
200 scene
202 person
210 evaluation image
212 evaluation image
214 evaluation image
216 evaluation image
218 archival image
220 area of importance

What is claimed is:

1. A method for determining an area of importance in an archival image that shows a field of view of a scene, the method comprising the steps of:
obtaining the archival image;
obtaining a set of evaluation images each depicting a field of view of the scene captured during a process of composing the archival image;
comparing the field of view of the archival image to field of view of at least one of the evaluation images to determine which portions of the field of view of the archival image show portions of the scene that are also shown in the filed of view of the evaluation image against which the field of view of the archival image is compared;
determining area of importance data that can be used to identify the determined portions of the field of view of the archival image; and
storing the area of importance data in association with the archival image.

2. The method of claim 1, wherein the step of associating the area of importance data and the archival image comprises storing the area of importance data with the archival image.

3. The method of claim 1, wherein the step of associating area importance data with the archival image comprises storing the area of importance data with the archival image in a common digital file.

4. The method of claim 1, wherein the step of associating area of importance data with the archival image comprises storing the area interest data in the archival image.

5. The method of claim 1, wherein the step of associating area of importance data with the archival image comprises storing the archival image in a form having a stored image resolution in the area of importance that is higher than the stored image resolution in the remainder of the archival image.

6. The method of claim 1, wherein the step of associating the area of importance data and the archival image comprises adapting the archival image so that the area of importance is stored in a compression ratio that is lower than the compression ratio used to store the remainder of the archival image.

7. The method of claim 1, wherein the area of importance data comprises an area of importance image containing image elements from the area of importance.

8. The method of claim 1, wherein the evaluation image is captured within a predetermined time period immediately preceding capture of the archival image.

9. The method of claim 1, wherein a sequence of evaluation images are captured during composition and wherein the step of determining portions is performed by comparing the archival image to the sequence of the evaluation images beginning with the evaluation image that is captured immediately prior to the capture of the archival image and continuing with additional prior images in sequence until the determined field of view of the archival image is defined by a predetermined minimum image space of the image elements of the archival image.

10. The method of claim 1, wherein a sequence of evaluation images are captured during composition and wherein the step of determining portions is determined by comparing the archival image to the sequence of the evaluation images beginning with the evaluation image that is captured immediately prior to the capture of the archival image and continuing with additional prior images until the identified common image elements define a predetermined minimum portion of the image elements of the archival image.

11. The method of claim 1, wherein a sequence of evaluation images are captured during composition and wherein the step of determining portions is performed by comparing the field of view of the archival image to the fields of view of each of a sequence of evaluation images beginning with the evaluation image captured immediately prior to the capture of the archival image and continuing with additional prior images until the identified common image elements define a predetermined minimum of horizontal image elements of the archival image.

12. The method of claim 1, wherein a sequence of evaluation images are captured during composition and wherein the step of determining portions is performed by comparing the field of view of the archival image to the fields of view of each of a sequence of evaluation images beginning with the evaluation image captured immediately prior to the capture the archival image and continuing with additional prior images until the identified common image elements define a predetermined minimum of vertical image elements of the archival image.

13. The method of claim 1, wherein the portions are determined by comparing the field of view of the archival image to the field of view of more than one evaluation image and wherein the evaluation images used for comparison are limited to those having a field of view of the evaluation images that are smaller than a maximum threshold and closest in time to the capture of the archival image.

14. The method of claim 1, wherein the common image elements are displayed as an area of importance to a user of the imaging system.

15. The method claim 1, further comprising the steps of displaying the evaluation images during composition and adapting the display of the evaluation images to indicate the field of view of the determined area of importance.

16. The method of claim 1, further comprising the steps of displaying an evaluation image that corresponds to the captured archival image after capture of the archival image and adapting the display of the corresponding evaluation image to indicate the common image elements.

17. A method for determining an area of importance in an archival image, the method comprising the steps of:
capturing a set of evaluation images during composition of the archival image, but prior to capturing the archival image;
capturing the archival image;
forming a preliminary area of importance image based upon the captured archival image;
extracting portions of the preliminary area of importance image that do not correspond to image information in the images of the set of evaluation images; and
storing the remaining portions of the preliminary area of importance image as an area of importance image and associating the area of importance image with the archival image.

18. The method of claim 17, wherein the step of associating the area of importance image with the archival image comprises storing the area of importance image in association with the archival image.

19. The method of claim 18, wherein the step of capturing a set of evaluation images comprises capturing a sequence of evaluation images and the step of extracting portions of the preliminary area of importance image that do not correspond to image information in the images of the set of evaluation images comprises extracting image information from the preliminary area of importance image that do not correspond to the image information in the evaluation images by comparing the archival image to the evaluation images in a reverse sequence beginning with the first evaluation image and continuing to extract image information from the preliminary area of importance by extracting image information from the additional evaluation images so long as the preliminary area of importance that remains after extraction meets a threshold condition.

20. The method of claim 17, further comprising the step of detecting user input indicating that selected ones of the obtained evaluation images are to be used in determining the area of importance wherein only the selected evaluation images are used to determine the area of importance.

21. A method for determining an area of importance in an archival image comprising the steps of:
detecting composition of an archival image of a scene;
obtaining a set of evaluation images of the scene during composition, but prior to capturing the archival image;
capturing the archival image;
obtaining an evaluation image corresponding to the archival image comparing the corresponding evaluation image to the sequence of evaluation images to identify which portions of the scene shown in the archival image are also shown in each of the evaluation image in the sequence of evaluation images;
generating area of importance data characterizing the portions of the archival image that correspond to the common portions of the evaluation image;
storing the area of importance data; and
associating the area of importance data with the archival image.

22. An imaging system comprising:
an image source operable to obtain evaluation images during composition of an archival image and prior to capturing the archival images;
a signal processor comparing the evaluation images and the archival image to identify which portions of the archival image show portions of the scene that are also shown by that all of the evaluation images;
wherein the signal processor stores area of importance data from which the identified portions of the archival image can be determined and associates the area of importance data with the archival image.

23. The imaging system of claim 22, wherein the signal processor stores the area of importance data with the archival image.

24. The imaging system of claim 22, wherein the signal processor stores the area of importance data with the archival image in a common digital file.

25. The imaging system of claim 22, wherein the signal processor stores the area interest data in the archival image.

26. The imaging system of claim 22, wherein the signal processor stores the archival image in a form having a stored image resolution in the area of importance that is higher than the stored image resolution in the remainder of the archival image.

27. The imaging system of claim 22, wherein image elements associated with the identified area of importance is stored in the archival image at a compression ratio that is lower than the compression ratio used to store the remainder of the archival image.

28. The imaging system of claim 22, wherein the area of importance data comprises an area of importance image containing image elements from the area of importance.

29. The imaging system of claim 22, wherein the set of evaluation images include evaluation images that were captured within a predetermined time period immediately preceding capture of the archival image.

30. The imaging system of claim 22, wherein the set of evaluation images comprise a sequence of evaluation images captured during composition and wherein the signal processor compares the archival image to the sequence of the evaluation images beginning with the evaluation image that is captured immediately prior to the capture of the archival image and continuing with additional prior images in sequence until the identified portions define a predetermined minimum image space of the image elements of the archival image.

31. The imaging system of claim 22, wherein the set of evaluation images comprise a sequence of evaluation images is captured during composition and wherein the signal processor compares the archival image to the sequence of the evaluation images beginning with the evaluation image that is captured immediately prior to the capture of the archival image and continuing with additional prior images until the identified portions define a predetermined minimum portion of the image elements of the archival image.

32. The imaging system of claim 22, wherein the set of evaluation images comprises a sequence of evaluation images are captured during composition and wherein the signal processor compares the archival image to the sequence of evaluation images beginning with the evaluation image captured immediately prior to the capture of the archival image and continuing with additional prior images until the identified common image elements define a predetermined minimum of horizontal image elements of the archival image.

33. The imaging system of claim 22, wherein a sequence of evaluation images are captured during composition and wherein the signal processor compares the archival image to the sequence of evaluation images beginning with the evaluation image captured immediately prior to the capture the archival image and continuing with additional prior images until the identified common image elements define a predetermined minimum of vertical image elements of the archival image.

34. The imaging system of claim 22, wherein the common image elements are identified by comparing the evaluation images to detect shifts in the field of view of the evaluation images that are smaller than a maximum threshold and closest in time to the capture of the archival image.

35. The imaging system of claim 22, wherein the common image elements are displayed to a user of the imaging system.

36. The imaging system of claim 22, further comprising the steps of the display evaluation images during composition and adapting the display of the evaluation images to indicate of the common elements defining the area of importance.

37. The imaging system of claim 22, further comprising the steps of displaying an evaluation image that corresponds to be captured archival image after capture of the archival image and adapting the display of the corresponding evaluation image to indicate the common image elements.

38. An imaging system comprising:
   an image capture system adapted to capture evaluation images during composition of an archival image and prior to capturing the archival image;
   a display system for presenting a series of evaluation images to a user of the imaging system during composition of an archival image;
   a memory; and
   a processor storing evaluation images in the memory during composition and obtaining an area of importance image that corresponds to the archival image;
   wherein the processor compares the area of importance image to the series of evaluation images beginning with the evaluation image captured immediately prior to the capture of the archival image and continuing sequentially with additional prior evaluation images until a threshold criterion is met and extracts image information from the area of importance image that does not correspond to image information in the evaluation images with which it is compared.

39. The imaging system of claim 38, wherein the signal processor stores the area of importance image in association with the archival image.

40. An imaging system comprising:
   a composition trigger adapted to generate a composition signal for composing an archival image and a capture trigger adapted to generate an archival image capture signal for capturing the archival image;
   an image capture system adapted to capture evaluation images when the composition signal is generated and subsequently to capture an archival image when the archival image capture signal is generated; and
   a processor adapted to compare the archival image to the evaluation images and identify all of the image elements in the archival image that correspond to image elements in each of the evaluation images;
   wherein the processor is further adapted to associate area of importance data that identifies the corresponding portions of the archival image with the archival image.

41. A imaging system comprising:
   an image capture means for capturing an archival image and for capturing an evaluation image during composition of the archival image, but prior to capturing the archival image;
   a comparison means for comparing the evaluation images to the archival image to identify all of the image elements that are found both in the archival image and each of the evaluation images; and
   an associating means for associating area of importance data characterizing the common image elements with the archival image.

42. The imaging system of claim 41, wherein the image capture means captures more than one evaluation image during composition of the archival image and the imaging system further comprises a user interface adapted to receive a signal indicating that selected ones of the evaluation images are to be used in determining the area of importance wherein only the selected evaluation images are used to determine the area of importance.

* * * * *

UNITED STATES PATENT AND TRADEMARK OFFICE
CERTIFICATE OF CORRECTION

PATENT NO. : 7,327,890 B2  Page 1 of 1
APPLICATION NO. : 10/324489
DATED : February 5, 2008
INVENTOR(S) : John R. Fredlund It is certified that error appears in the above-identified patent and that said Letters Patent is hereby corrected as shown below:

|  | Line | Description of Error |
|---|---|---|
| On the Title Pg Item (57) (Abstract) | 3 | Delete "images" and insert -- image --, therefor. |
| Col. 19 | 39 (Approx.) | In Claim 1, delete "filed" and insert -- field --, therefor. |
| Col. 19 | 53 | In Claim 3, after "area", insert -- of --. |
| Col. 20 | 46 (Approx.) | In Claim 12, after "capture" insert -- of --. |
| Col. 21 | 22 | In Claim 19, delete "claim 18" and insert -- claim 17 --, therefor. |
| Col. 21 | 67 | In Claim 22, after "by" delete "that". |
| Col. 22 | 42 | In Claim 31, delete "is" before "captured". |
| Col. 22 | 63 | In Claim 33, after "capture" insert -- of --. |
| Col. 23 | 10 | In Claim 36, after "display" insert -- of --. |
| Col. 23 | 12 | In Claim 36, after "indicate" delete "of". |
| Col. 23 | 16 | In Claim 37, delete "be" and insert -- the --, therefor. |

Signed and Sealed this

Ninth Day of February, 2010

David J. Kappos
*Director of the United States Patent and Trademark Office*